(12) United States Patent
Viorel et al.

(10) Patent No.: US 8,284,700 B2
(45) Date of Patent: Oct. 9, 2012

(54) SYSTEM AND METHOD FOR COOPERATIVE DATA TRANSFER

(75) Inventors: Dorin Viorel, Calgary (CA); Masato Okuda, Saitama (JP); Kevin Power, Middlesex (GB); Luciano Sarperi, Middlesex (GB)

(73) Assignee: Fujitsu Semiconductor Limited, Yokohama (JP)

( * ) Notice: Subject to any disclaimer, the term of this patent is extended or adjusted under 35 U.S.C. 154(b) by 348 days.

(21) Appl. No.: 12/604,551

(22) Filed: Oct. 23, 2009

(65) Prior Publication Data
US 2010/0172267 A1    Jul. 8, 2010

Related U.S. Application Data

(60) Provisional application No. 61/142,999, filed on Jan. 7, 2009.

(51) Int. Cl.
*H04L 12/28* (2006.01)

(52) U.S. Cl. ........ 370/254; 370/328; 370/338; 370/342; 455/434

(58) Field of Classification Search .................. 370/254, 370/315, 328; 455/434
See application file for complete search history.

(56) References Cited

U.S. PATENT DOCUMENTS

| | | | |
|---|---|---|---|
| 2007/0076649 A1* | 4/2007 | Lin et al. | 370/328 |
| 2008/0080463 A1* | 4/2008 | Stewart et al. | 370/342 |
| 2010/0034135 A1* | 2/2010 | Kim et al. | 370/315 |
| 2010/0069066 A1* | 3/2010 | Shen et al. | 455/434 |
| 2010/0085917 A1* | 4/2010 | Gorokhov et al. | 370/328 |

OTHER PUBLICATIONS

DRAFT Standard for Local and Metropolitan Area Networks, Part 16: Air Interface for Broadband Wireless Access Systems, P802.16 Rev2/D7 Oct. 2008, © 2008 IEEE (2080 pgs.).

* cited by examiner

*Primary Examiner* — Robert Wilson
*Assistant Examiner* — Mohamed Kamara
(74) *Attorney, Agent, or Firm* — Baker Botts L.L.P.

(57) ABSTRACT

A method for cooperative data transfer includes establishing a primary wireless connection with a primary access station. The primary wireless connection uses a primary synchronization channel that is transmitted during a first frame of a super frame. The super frame comprises a plurality of frames. The method also includes detecting a secondary synchronization channel generated by an alternate access station during a subsequent frame of the super frame. The method further includes determining whether the detected secondary synchronization channel has a signal strength greater than a threshold signal strength. The method additionally includes receiving permission to begin a cooperative data transfer operation with both the primary access station and the alternate access station.

18 Claims, 4 Drawing Sheets

SYSTEM AND METHOD FOR COOPERATIVE DATA TRANSFER

CROSS-REFERENCE TO RELATED APPLICATION

This application claims the benefit of priority under 35 U.S.C. §119(e) of U.S. Provisional Application Ser. No. 61/142,999 filed Jan. 1, 2009.

TECHNICAL FIELD

The present invention relates generally to wireless communications, and more particularly to systems and method for cooperative data transfer.

BACKGROUND

In many cellular wireless communication systems, the network stations (e.g., macrocell, picocell, femtocell base stations or relay stations) are identified by two different parameters. The first such parameter is the cell ID. The cell ID is a physical layer ("PHY") specific parameter which is broadcast at regular intervals as part of the preamble or synchronization channel in orthogonal frequency-division multiple access ("OFDMA") systems. The cell ID could be transmitted by a base station so as to be decoded and processed by an endpoint. In situations in which an endpoint is positioned in an area where there is overlapping coverage from multiple base stations, the transmission of the cell ID may help prevent the endpoint from processing a downlink frame broadcast by a neighboring base station (different than the base station to which the endpoint is currently coupled). The cell ID parameter may be re-used throughout the network, subject to certain radio frequency ("RF")/PHY isolation restrictions. The second identifying parameter is the Base Station Identification (BSID). The BSID is a unique identification parameter allocated for an access station entity (e.g., a femto, pico, micro, or macro base station or a relay station). This parameter is used by the logical upper layer (e.g., media access control layer "MAC") in order to properly support different message transactions and handover. The BSID is not re-used throughout the wireless network.

SUMMARY

The teachings of the present disclosure relate in general to a method for cooperative data transfer that includes establishing a primary wireless connection with a primary access station. The primary wireless connection uses a primary synchronization channel that is transmitted during a first frame of a super frame. The super frame comprises a plurality of frames. The method also includes detecting a secondary synchronization channel generated by an alternate access station during a subsequent frame of the super frame. The method further includes determining whether the detected secondary synchronization channel has a signal strength greater than a threshold signal strength. The method additionally includes receiving permission to begin a cooperative data transfer operation with both the primary access station and the alternate access station.

Technical advantages of particular embodiments include allowing an endpoint to cooperatively communicate with multiple access stations. Accordingly, the endpoint may increase its available bandwidth.

Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
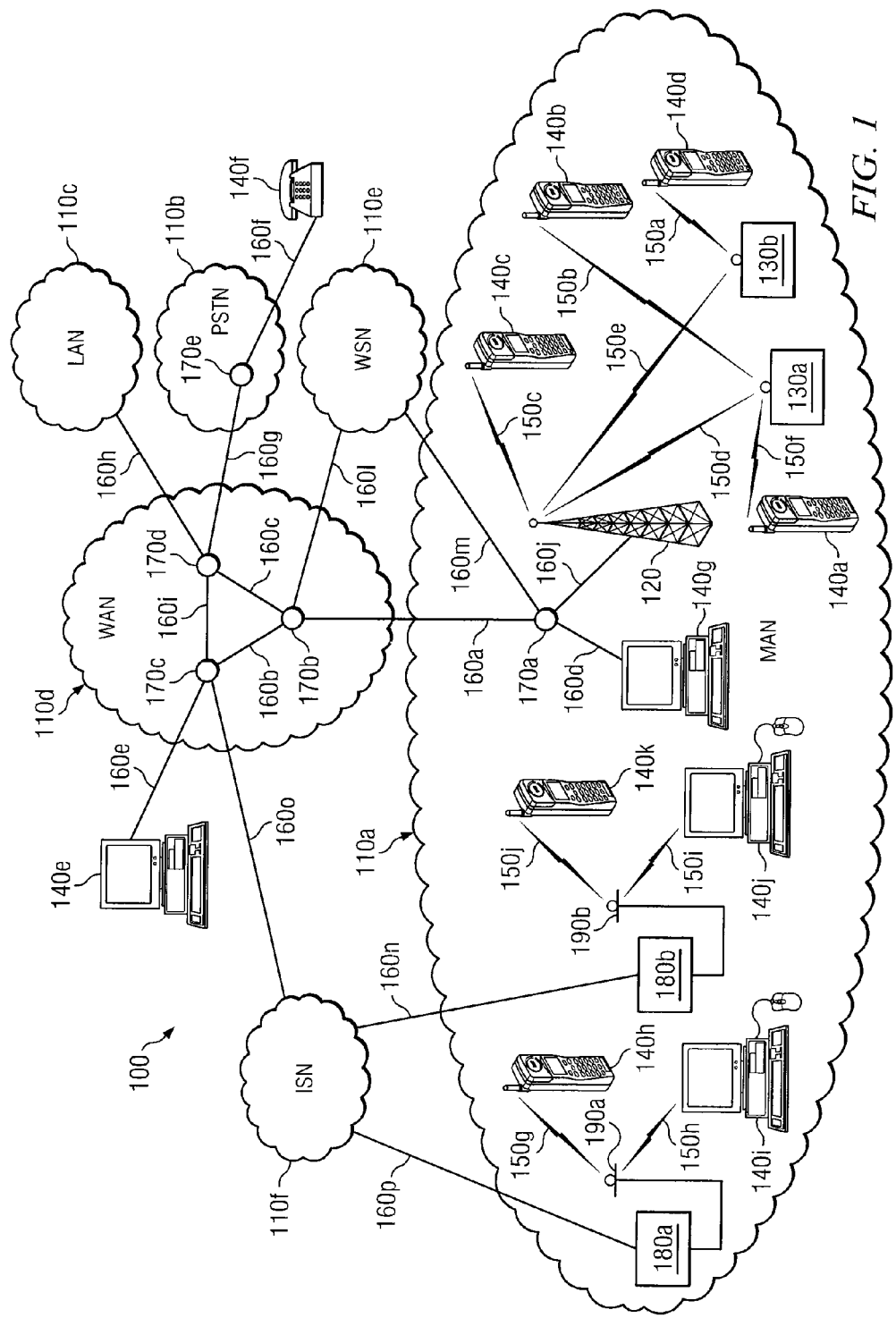
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks comprising any of a variety of communication protocols designed to support one or more different services either independently or in conjunction with other networks and/or communications protocols. For example, networks 110 may facilitate network and/or Internet access via wired or wireless connections (e.g., a WiMAX service). The network access may allow for online gaming, file sharing, peer-to-peer file sharing (P2P), voice over Internet protocol (VoIP) calls, video over IP calls, or any other type of functionality typically provided by a network. In particular embodiments, one or more of networks 110 may comprise an 802.16 based wireless network, popularly known as WiMAX, which may include base stations 120, relay stations 130, and femto base stations 190.

Each of endpoints 140 are connected to one of base station 120, relay stations 130, or femto base stations 190. For simplicity, the component to which an endpoint is connected may generally be referred to as an access station. For example, the access station for endpoint 140h is femto base station 190a. Between each endpoint 140 and its respective access station there may be a wireless connection 150, sometimes referred to as an access link. These wireless connections may be referred to as access links because they provide the endpoint with access to a network. Similarly, between each relay station and macro base station (or between two relay stations) there may be a wireless connection 150, sometimes referred to as a relay link. This wireless connection may be referred to as a relay link because it relays communications between the access links and the macro base station. In particular embodiments, network 110a may utilize a frame structure, such as the one depicted in FIG. 3, which may allow for an endpoint to cooperatively communicate with multiple access stations. This may allow an endpoint to have an access link with multiple access stations, thereby increasing the bandwidth available to that endpoint.

A wireless connection may comprise various wireless resources such as, for example, a combination of a particular center frequency, a particular bandwidth, a particular time slot, and/or a particular subchannel or group of subchannels (for example, as described in a downlink or uplink map).

Although the example communication system 100 of FIG. 1 includes six different networks, networks 110a-110f, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110f may be implemented as a LAN, WAN, MAN, PSTN, WiMAX network, global distributed network such as the Internet, Intranet, Extranet, or any other form of wireless or wired network.

Networks 110 may include any number and combination of wired links 160, wireless connections 150, nodes 170 and/or endpoints 140. For purposes of illustration, and only by way of example, network 110a is a MAN that may be implemented, at least in part, via WiMAX; network 110b is a PSTN (e.g., a voice based network); network 110c is a LAN; network 110d is a WAN (e.g., a long range optical network or the Internet); WSN network 110e may be operated by a wireless service provider ("WSP") responsible for providing network 110a with wireless service (e.g., WiMAX); and Internet service network (ISN) network 110f may be operated by an internet service provider ("ISP") responsible for providing its users with Internet access. Though not depicted in FIG. 1, both WSN network 110e and ISN network 110f may include servers, modems, gateways and any other components that may be needed to provide their respective service.

Generally, networks 110a, and 110c-110f provide for the communication of packets, cells, frames, or other portions of information between endpoints 140 and/or nodes 170 (described below). In particular embodiments, networks 110a, and 110c-110f may be IP networks. Network 110b may, for example, be a PSTN that may include switching stations, central offices, mobile telephone switching offices, pager switching offices, remote terminals, and other related telecommunications equipment that are located throughout the world.

Any of networks 110a or 110c-110f may be coupled to other IP networks including, but not limited to, the Internet. Because IP networks share a common method of transmitting data, signals may be transmitted between devices located on different, but interconnected, IP networks. In addition to being coupled to other IP networks, any of networks 110a or 110c-110f may also be coupled to non-IP networks through the use of interfaces or components such as gateways.

The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

As noted above, wireless connections 150 may represent wireless links between two components using, for example, WiMAX. The extended range of a WiMAX macro base station, along with one or more relay stations and femto base stations, in certain cases, may allow network 110a to cover the larger geographic area associated with a MAN while using a relatively small number of wired links. More specifically, by properly arranging macro base station 120, multiple relay stations 130 and femto base stations 190 around a metropolitan area, the multiple access stations may use wireless connections 150 or existing wired links to communicate with macro base station 120, and wireless connection 150 to communicate with wireless endpoints 140 throughout the metropolitan area. Macro base station 120 may, through wired connection 160a, communicate with other macro base stations, any components of WSN network 110e, any network components not capable of establishing a wireless connection, and/or other networks outside of the MAN, such as network 110d or the Internet.

Nodes 170 may include any combination of network components, modems, session border controllers, gatekeepers, ISN gateways, WSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100.

Network access devices 180 may provide Internet access to femto base stations 190 through any combination of hardware, software embedded in a computer readable medium, and/or encoded logic incorporated in hardware or otherwise stored (e.g., firmware). In particular embodiments, network access device 180 may be supplied by the owner's ISP. For example, if the owner's ISP is a cable company then the ISP may supply a cable modem as the network access device 180. As another example, if the owner's ISP is a phone company then the ISP may supply an xDSL modem as the network access device 180. As may be apparent, network access device 180 may provide Internet access to components other than femto base stations 190. For example, the owner may connect his personal computer to network access device 180 to access the Internet.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140k may include a cell phone, an IP telephone, a computer, a video monitor, a camera, a personal data assistant or any other hardware, and/or software or logic that supports the communication of data using one or more of networks 110. Endpoints 140 may also include unattended or automated systems, gateways, other intermediate components or other devices that can send or receive data and/or signals.

Although FIG. 1 illustrates a particular number and configuration of endpoints, connections, links, networks, and nodes, communication system 100 contemplates any number or arrangement of such components for communicating data. In addition, elements of communication system 100 may include components centrally located (local) with respect to one another or distributed throughout communication system 100.

Figure 2:
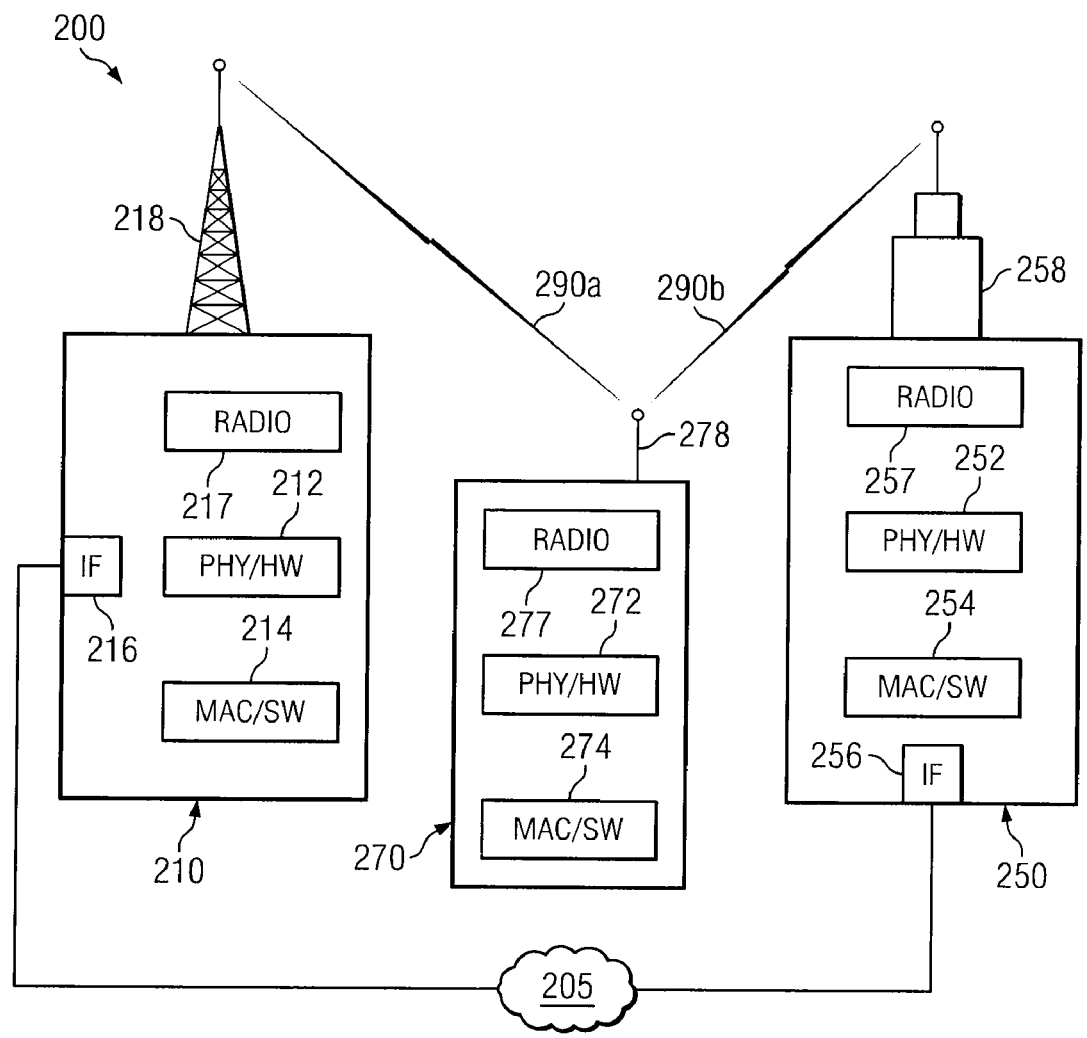
FIG. 2 illustrates a wireless network comprising a more detailed view of an endpoint, a base station and a femto base station, in accordance with a particular embodiment.

FIG. 2 illustrates a wireless network comprising a more detailed view of an endpoint, a base station and a femto base station, in accordance with a particular embodiment. More specifically, in the depicted embodiment network 200 comprises network 205, base station 210, femto base station 250 and endpoint 270. In different embodiments network 200 may comprise any number of wired or wireless networks, base stations, endpoints, relay stations, femto base stations, and/or any other components that may facilitate or participate in the communication of data and/or signals whether via wired or wireless connections. Base station 210 and femto base station 250 both comprise their own respective PHY/hardware ("HW") blocks 212 and 252, MAC/software ("SW") blocks 214 and 254, communication interfaces 216 and 256, radios 217 and 257 and antennas 218 and 258. Similarly, endpoint 270 comprises PHY/HW 272, MAC/SW 274, radio 277, and antenna 278. These components may work together in order to provide wireless networking functionality, such as providing endpoint 270 the ability to engage in cooperative data transfers with base station 210 and femto base station 250.

Network 205 may comprise several separate but interconnected networks operated by one or more different operators. For example, it may comprise any number of the networks described above with respect to FIG. 1, including, but not limited to, the Internet, a LAN, WAN, MAN, PSTN or some combination of the above.

Endpoint 270 may be any type of wireless endpoint able to send and receive data and/or signals to and from base station 210 and/or femto base station 250. Some possible types of endpoints 270 may include desktop computers, PDAs, cell phones, smart phones, laptops, and/or VoIP phones.

PHY/HW blocks 212, 252 and 272 may include any hardware needed for the operation of base station 210, femto base station 250, and endpoint 270, respectively. For example, PHY/HW blocks 212, 252 and 272 may each comprise one or more processors. Each processor may be a microprocessor, controller, application specific integrated circuit (ASIC), field programmable gate array (FPGA), or any other suitable computing device, resource, or combination of hardware, software and/or encoded logic operable to provide, either alone or in conjunction with other components, (e.g., memory) wireless networking functionality. Such functionality may include providing various wireless features discussed herein. For example, one or more of the processors within PHY/HW blocks 212, 252 and 272 may be able to determine if cooperative operation is possible and if so, implement it.

As another example, PHY/HW blocks 212, 252 and 272 may also each comprise memory modules. Each memory module may be any form of volatile or non-volatile memory including, without limitation, magnetic media, optical media, random access memory (RAM), read-only memory (ROM), flash memory, removable media, or any other suitable local or remote memory component or components. The memory modules may store any suitable data, instructions, logic or information utilized by base station 210, femto base station 250, and endpoint 270, respectively, including software embedded in a computer readable medium, and/or encoded logic incorporated in hardware or otherwise stored (e.g., firmware). For example, the memory modules may store information regarding multiple sets of ranging parameters related to multiple access stations. Additional examples of information stored by the memory modules will be discussed below.

MAC/SW blocks 214, 254, and 274 may include any software, logic, or other information needed for the operation of base station 210, femto base station 250, and endpoint 270, respectively. In particular embodiments, the software, logic or other information may be stored within the memory modules of PHY/HW blocks 212, 252 and 272, respectively. For example, MAC/SW blocks 214, 254, and 274 may comprise, stored within the respective memory modules, logic that when executed by a processor within the respective PHY/HW block is operable to implement cooperative data transfers with endpoint 270.

Radios 217, 257, and 277 may be coupled to or a part of antennas 218, 258, and 278, respectively. Radios 217, 257, and 277 may receive digital data that is to be sent out to other access stations, relay stations and/or endpoints via a wireless connection. Radios 217, 257, and 277 may convert the digital data into a radio signal having the appropriate center frequency and bandwidth parameters. These parameters may be predetermined, for example, by a combination of PHY/HW block 212 and MAC/SW block 214 of base station 210. The radio signal may then be transmitted via antennas 218, 258, or 278 to the appropriate recipient. Similarly, radios 217, 257, and 277 may convert radio signals received via antennas 218, 258, or 278, respectively, into digital data to be processed by PHY/HW blocks 212, 252, or 272 and/or MAC/SW blocks 214, 254, or 274 as appropriate.

Antennas 218, 258, and 278 may be any type of antenna capable of transmitting and/or receiving wireless signals. In some embodiments, antennas 218, 258, and 278 may comprise one or more omni-directional, sector or panel antennas operable to transmit/receive radio signals between 0.7 GHz and 66 GHz. An omni-directional antenna may be used to transmit/receive radio signals across a 360 degree horizontal coverage, a sector antenna may be used to transmit/receive radio signals from devices within a particular area, and a panel antenna may be a line of sight antenna used to transmit/receive radio signals in a relatively straight line. Together, radio 217 and antenna 218, radio 257 and antenna 258, and radio 277 and antenna 278 may each form a wireless interface.

Communication interfaces 216 and 256 may be used for the back haul connection from base station 210 and/or femto base station 250 to network 205. For example, communication interface 216 may perform any formatting or translating that may be needed to allow base station 210 to send and receive data from network 205 over a wired connection. As another example, communication interface 256 may comprise an interface (e.g., RJ-45) that is compatible with a corresponding interface on a network access device, such as an Ethernet interface, used to provide femto base station 250 with access to the Internet. While not depicted, in certain embodiments, endpoint 270 may also include a communication interface.

In certain embodiments, it may be desirable to use multiple femto base stations to enhance the coverage of one or more base stations within a particular metropolitan area. Depending on the scenario, each of the femto base stations may operate in Closed Subscriber Group (CSG) or Open Subscriber Group (OSG) mode. In CSG mode, only those endpoints authorized by the owner of the respective femto base station may access the femto base station; in OSG mode, any endpoint may access the femto base station.

If each of the potential access stations were to re-use the same preamble index sequence in such a dense urban environment, the endpoints could suffer significant synchronization problems because, at any given time, an endpoint may only be synchronized with a single access station. This could, in turn, trigger unnecessary network re-entry procedures and related traffic outages due to inadequate link adaptation settings (the link distance can no longer be accurately calculated, thus compromising the related frequency, timing and power parameters). To avoid this, particular embodiments may use a frame structure (see FIG. 3 below) that may mitigate the problems associated with preamble index re-use in dense urban environments. Accordingly, particular embodiments may support cooperative data transfers even when, from endpoint 270's perspective, there are large propagation delays exhibiting large instantaneous variations between close and distant access stations.

In the depicted embodiment, it may be assumed that endpoint 270 is within wireless range of both base station 210 and femto base station 250 and that the signal strength of each of signals 290a and 290b is above a predetermined threshold. Furthermore, it may also be assumed that the distance between endpoint 270 and base station 210 may be significantly greater than the distance between endpoint 270 and femto base station 250 (e.g., 6 km compared to 6 m). This disparity in distance may have a corresponding disparity in propagation delay for communications sent to/from endpoint

270. In some situations this disparity may be as high as twenty microseconds. Accordingly, in such a situation, if endpoint 270 were to attempt to connect with femto base station 250 and base station 210 in successive frames of a typical wireless network (e.g., as in fast base station switching), the timing of the data received by endpoint 270 would render the data useless.

The problem the distance disparity causes may be better understood in the context of an example. Assume that endpoint 270 is unable to perform multi-peer ranging and is initially connected to femto base station 250. In establishing this connection, the endpoint would have performed ranging with femto base station 250 as part of a network entry procedure. Ranging is the process in which a subscriber station adjusts its timing, frequency and transmission power parameters in order to synchronize/adapt to a network via an access station. During this initial ranging procedure, endpoint 270 may be able to calculate a delay (e.g., 20 nanoseconds) associated with communications with femto base station 250. Following a successful ranging procedure, endpoint 270 obtains its management connection identifiers. When endpoint 270 attempts to transfer data with a distant access station, the propagation delay is not properly calculated and endpoint 270 is unable to properly process such a large delay (e.g., 20 microseconds).

To overcome the disparity in propagation delays, particular embodiments may use a multi-peer ranging procedure. Multi-peer ranging may be used by endpoint 270 to facilitate cooperative data transfers with both near and distant access stations (e.g., base station 210 and femto base station 250). In particular embodiments, this may be done by taking advantage of the different types of access stations transmitting their preambles, including the related cell IDs, synchronously at different positions in time. This information may be stored by endpoint 270, thus providing ranging information for multiple neighboring access stations.

Figure 3:
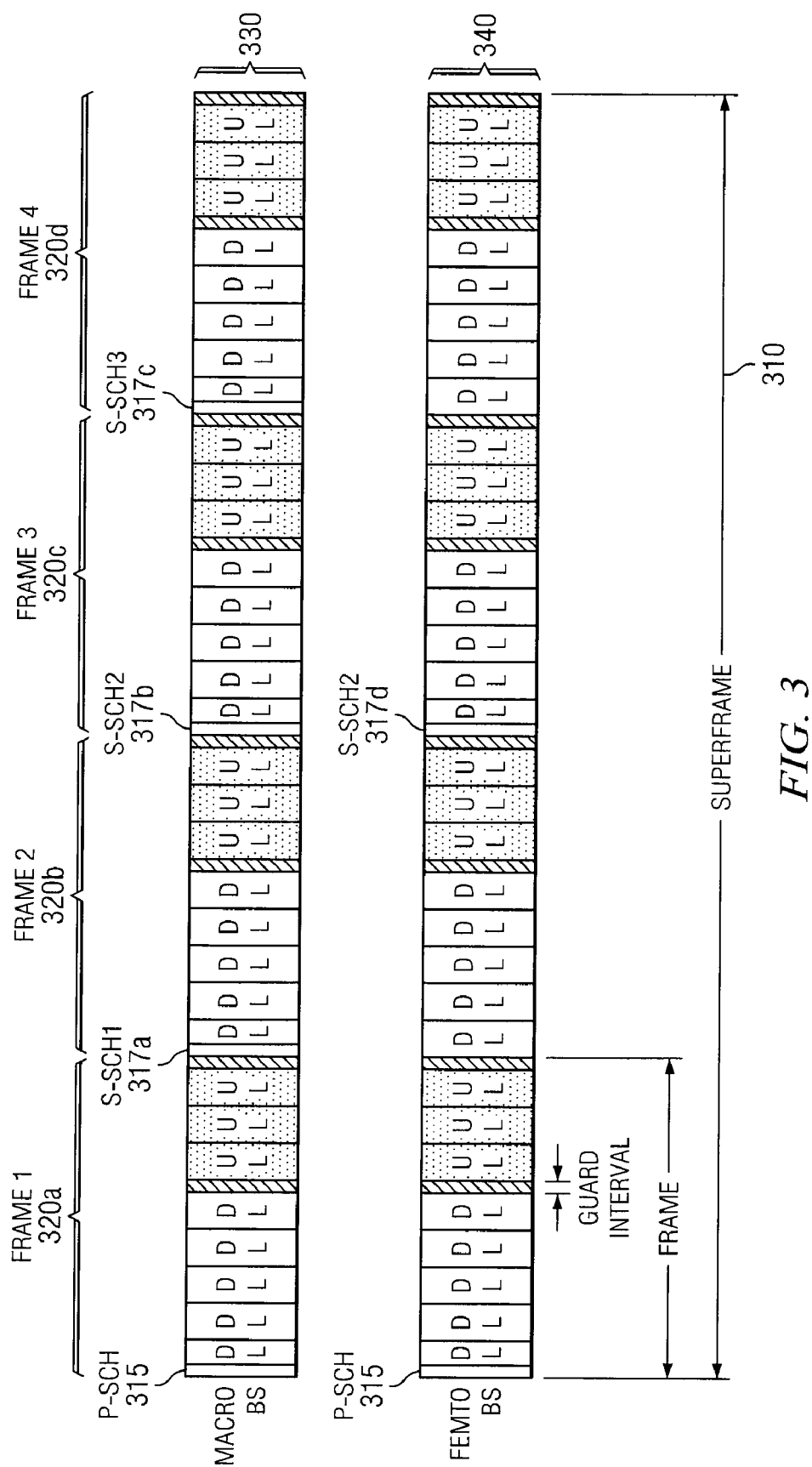
FIG. 3 illustrates a frame structure used in a wireless network, in accordance with a particular embodiment.

FIG. 3 illustrates a frame structure used in a wireless network, in accordance with a particular embodiment. Traditionally, for example in IEEE 802.16e (WiMAX) based systems, an access station transmits its preamble using synchronous time-frequency allocations. The preamble may, in essence, operate as a known training sequence that may allow an endpoint to properly adjust its frequency, timing and RF power. Once a preamble is detected by an endpoint, the endpoint remains locked onto the received frame structure from the access station for as long as it receives the same preamble (with the same preamble index). Unfortunately, this traditional approach provides limited support for a cooperative data transfer mode in which the endpoint increases its performance (e.g., throughput) by being serviced by multiple access stations. More specifically, in the traditional approach, the frame structure does not provide a way for an endpoint that is locked onto a particular frame structure, to properly perform ranging with other access stations using other frame structures.

In the embodiment depicted in FIG. 3 there is an example of a synchronization channel architecture for possible use in IEEE 802.16 derivative systems (e.g., 802.16m). For example, in an IEEE 802.16m system, there exist two hierarchy levels for the synchronization channel: a primary synchronization channel (P-SCH) 315 and a secondary synchronization channel (S-SCH) 317. In an embodiment using IEEE 802.16m (or any other wireless protocol or standard), P-SCH 315 may carry information such as the fast Fourier transform (FFT) type, the access station type (e.g., macro, micro, pico, femto or relay station), a segment number, and the access station's position in the cell cluster. In some embodiments, a macro base station, a micro base station and a pico base station may be treated similarly with respect to access station type because they may use similar preamble index structures.

The frame structure depicted in FIG. 3 is based on superframe 310 which is composed of four individual frames 320. Superframe 310 may consist of two slightly different variants depending on whether the access station is a macro base station type access station (e.g., a macro base station, a micro base station or a pico base station) or a femto base station. More specifically, superframe variant 330 depicts the frames 320 transmitted by a macro base station type access station and superframe variant 340 depicts the frames 320 transmitted by a femto base station.

In particular embodiments, the four individual frames 320 of superframe 310 may be used to provide two levels of synchronization as discussed above. More specifically, P-SCH 315 may be transmitted at the beginning of the first frame 320*a* of superframe 310 to provide coarse synchronization and then S-SCHs 317 may be transmitted at the beginning of the next three subsequent frames 320. Thus, in frame 320*a*, any access stations (e.g., base station 210 and femto base station 250) within a cluster of cells (as defined by the operator) may synchronously transmit P-SCH 315. It may be assumed that within a particular cluster of tier 1 and 2 cells (e.g., those access stations that are closest to a central macro base station), no two macro base station type access stations re-use the same preamble index. This may help to reduce or eliminate any impact receiving multiple preambles may have on the physical layer operation of endpoint 270 which may be synchronized on base station 210's preamble.

Then, depending on the type of access station and/or the endpoints connected thereto, the access station may or may not transmit one or more S-SCHs 317. More specifically, a macro base station type access station using superframe variant 330 may be required to transmit S-SCHs 317*a* and 317*c* at the beginning of frames 320*b* and 320*d*, respectively; whereas a femto base station using superframe variant 340 may be required to transmit S-SCH 317*d* at the beginning frame 320*c*. Furthermore, in some scenarios, for example in high mobility applications, a macro base station type access station may optionally transmit S-SCH 317*b* at the beginning of frame 320*c*.

In particular embodiments, there may be at least 512 different P-SCH preamble sequences (FFT type=2 bits; access station type=2 bits; sector information=2 bits; cell position=3 bits; $2^9$=512). While the number of preamble sequences may prevent neighboring base stations from sharing the same preamble index (thus avoiding a strong P-SCH interference), perfect isolation may not be possible in dense networks. Accordingly, in particular embodiments, as mentioned above, it may be desirable for P-SCH 315 to only be used for initial, coarse, synchronization, while S-SCHs 317 may carry the actual cell ID.

Base station 210 may be a high or medium power access station using three segment/sector operation. Because there may be a minimum physical separation allocated for tier one and two access stations (e.g., where a honeycomb macro base station type access station structure is used, tier one may comprise seven macro base station type access stations and tier two may comprise 12 macro base station type access stations), each of them with three sectors, S-SCH 317*a* may have a minimum of fifty-seven ((7+12)*3=57) different preamble indexes but may typically have 512 different preamble indexes. In certain scenarios, this may be reduced to an 802.16e functional case when the four subframes of superframe 310 transmit the same preamble sequence (P-SCH). In the illustrated embodiment, S-SCHs 317*a* and 317*c* may be used by any smaller base station type entity, such as a micro or pico base station, and the location of S-SCH 317b may be used by any femto base stations, such as femto base station 250. In some embodiments that may use 802.16e, S-SCH 317a and S-SCH 317c may have a different structure than P-SCH 315 thereby allowing an increased number of preamble indexes (e.g., 512 or more).

In particular embodiments, there may be a minimum of 512 different S-SCH 317b preambles (other than the preamble structure of S-SCH 317a and 317c). In certain embodiments, the segment number and base station position within a cluster of cells (e.g., as defined by the operator) may be inherited or re-used by femto base station 250. However, it may be the case that femto base station 250 may not use the same segment as base station 210 because base station 210 may be the base station that covers femto base station 250. In certain embodiments, the minimum overall number of distinct femto base stations, across a cluster of seven macro base stations, based on three segment operation is 10,752 different femto base stations (3 segment*7 cluster position*512 preambles=10752).

S-SCH 317b may be optional for the operation of base station 210. For example, base station 210 may only use S-SCH 317b for highly mobile endpoints (e.g., endpoints moving in excess of 100 km/h). When employed, base station 210 may use the same preamble index sequence for S-SCH 317b as it uses for S-SCHs 317a and 317c but which is different than S-SCH 317b used by femto base station 250.

The following example may refer to elements of both FIGS. 2 and 3. In this example, it may be assumed that endpoint 270 has established a wireless connection with femto base station 250. The connection between endpoint 270 and femto base station 250 may have been established after endpoint 270 successfully completed a network entry procedure related to femto base station 250. Accordingly, it may be assumed that endpoint 270 is locked onto femto base station 250's preamble in S-SCH 317b.

While connected to femto base station 250, endpoint 270 may periodically scan for the preambles received in P-SCH 315, S-SCH 317a, S-SCH 317b, and S-SCH 317c. The scan may allow endpoint 270 to estimate the signal quality of any neighboring access stations, such as base station 210, and determine the range thereto. This information may be stored by endpoint 270, thereby providing it with ranging information for multiple potential access stations. The respective ranging information may be used by endpoint 270 should it need to enter a cooperative data transfer mode.

If endpoint 270 detects S-SCH 317a having a signal strength above a first predetermined threshold, it may then also check the signal strength of S-SCH 317c to determine if it is above a second predetermined threshold. Depending on the embodiment or scenario, the first and second predetermined thresholds may be similar or different from one another depending on the operational needs or strategy of the network operator. For example, in some embodiments the first threshold may be lower than the second threshold to increase the number of instances in which the signal strength of S-SCH 317c is checked.

In addition to checking the quality of both S-SCH 317a and S-SCH 317c, endpoint 270 may determine whether the same FFT operation is specified in S-SCH 317a and S-SCH 317c as was specified in P-SCH 315. If both S-SCH 317a and S-SCH 317c are above their respective thresholds and specify the same FFT operation, then endpoint 270 may conclude that it is proximate to a neighboring macro base station type access station that may be able to provide endpoint 270 with a second access station for cooperative data transfers. In this example, it may be assumed that the signal from base station 210 exceeds both thresholds and thus endpoint 270 may assume that it is positioned in an area having overlapping coverage from base station 210 and femto base station 250 and that it may have PHY support for cooperative data transfer operations. Thus, endpoint 270 may further conclude that if additional bandwidth is needed, it may request cooperative data transfer enlisting the help of base station 210.

Upon endpoint 270 determining that additional bandwidth is needed, endpoint 270 may submit a request to a network manager (e.g., base station 210) for additional bandwidth provided by entering a cooperative data transfer mode. In particular embodiments, once cooperative data transfer operations have commenced, endpoint 270 may continue to monitor and measure S-SCH 317a and S-SCH 317c until endpoint 270 determines that cooperative data transfer is no longer needed. Once this has been determined, endpoint 270 may request reduced bandwidth which may end the cooperative data transfer mode.

While the depicted embodiment depicts a particular arrangement of P-SCH 315 and S-SCHs 317 within superframe 310, other embodiments may include different arrangements. For example, in some embodiments P-SCH 315 and S-SCH 317a may switch positions such that S-SCH 317a is first and P-SCH 315 is second.

Figure 4:
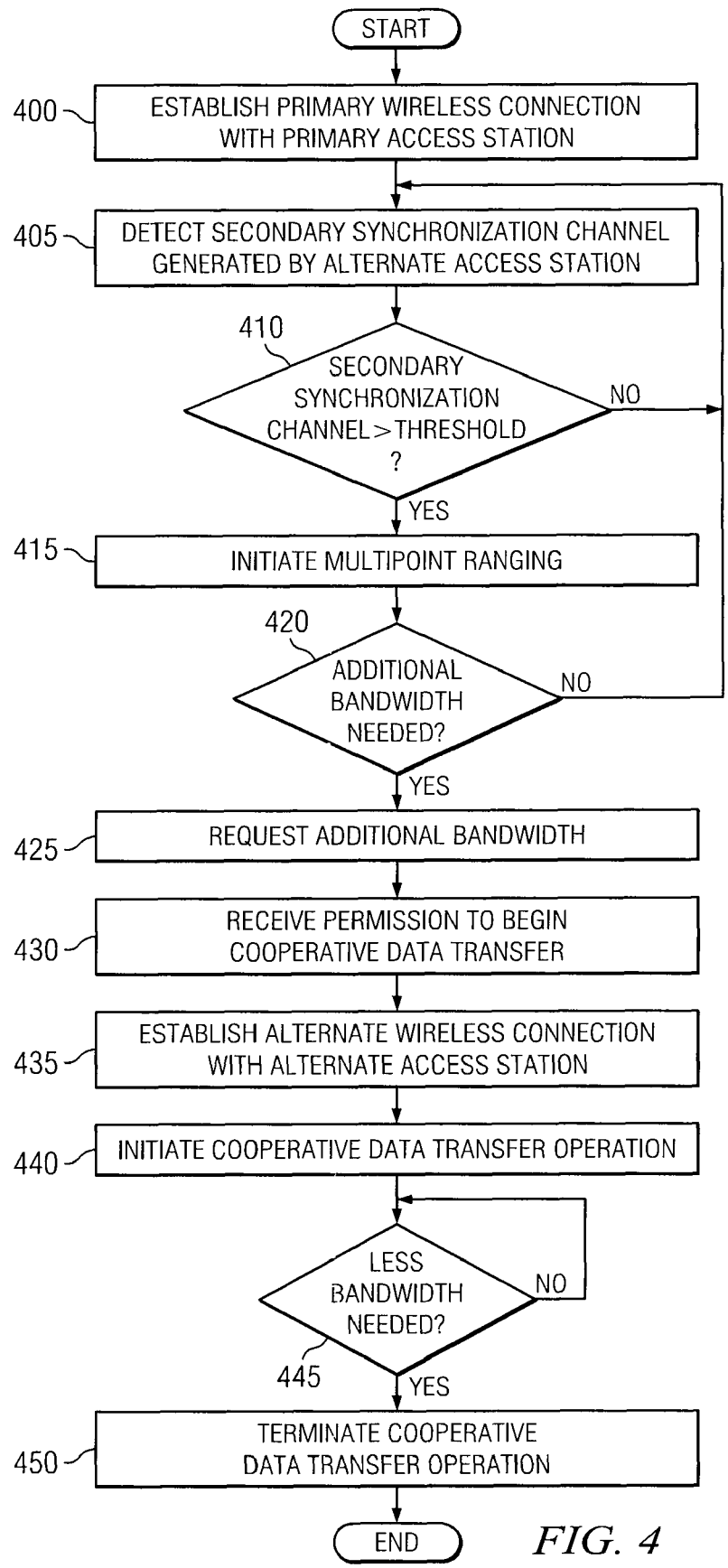
FIG. 4 illustrates a method for implementing cooperative data transfer, in accordance with a particular embodiment.

FIG. 4 illustrates a method for implementing cooperative data transfer, in accordance with a particular embodiment. The method begins at step 400 where a primary wireless connection is established with a primary access station. The primary wireless connection may be established using a primary synchronization channel and at least one secondary synchronization channel. The primary and secondary synchronization channels may be transmitted during separate frames of the same superframe comprising four separate frames. More specifically, the primary synchronization channel may comprise a preamble transmitted during a first frame of the super frame and the secondary synchronization channel may comprise a preamble transmitted during one of the subsequent frame of the superframe.

At step 405 an alternate secondary synchronization channel is detected. The alternate secondary synchronization channel may be generated by an alternate neighboring access station. In some embodiments, the alternate secondary synchronization channel may be detected during the second and fourth frames of the super frame. Alternatively, in some embodiments, the secondary synchronization channel may be detected during a third frame. For example, if the endpoint was initially connected to a macro base station type access station then the secondary synchronization channel may be transmitted by a femto base station and detected during the third frame whereas, if the endpoint was initially connected to a femto base station, then the secondary synchronization channel may be transmitted by a macro base station type access station and detected during the second and fourth frames. As can be seen in superframe variant 340 of FIG. 3 the femto base station does not always transmit a preamble. For example, during the second and fourth frames the femto base station does not transmit a preamble. This may allow an endpoint connected to the femto base station to detect alternate secondary synchronization channels from other base station type access stations. Similarly, as can be seen in superframe variant 330 of FIG. 3 the macro base station type access stations may optionally transmit or not transmit a preamble during the third frame. When the macro base station type access station is not using this optional preamble, an endpoint connected to the macro base station type access station may be able to detect an alternate secondary synchronization channel from a femto base station.

At step 410 an alternate secondary synchronization channel having a signal strength greater than a threshold is detected. If the secondary synchronization channel detected is less than the threshold then the method may return to step 405 to detect another secondary synchronization channel in a subsequent superframe. If the secondary synchronization channel is greater than the threshold then the method continues to step 415 where multipoint ranging is initiated. In some embodiments, the endpoint may need to detect the signal strength of two alternate secondary synchronization channels (e.g., 317a and 317c) and determine if they both are above two different, respective, thresholds.

Multipoint ranging may allow the endpoint to determine the distance, and thus the propagation delay, from the alternate access station to the endpoint. This may be in addition to the ranging that was performed between the endpoint and the primary access station. The endpoint may store the ranging information for both access stations. This information may be stored until it is needed, for example when additional bandwidth is needed. In particular embodiments, the endpoint may store multiple sets of ranging parameters related to multiple access stations and update these sets dynamically as time elapses and/or the endpoint moves through a cell or cluster of cells.

At step 420 it is determined that additional bandwidth is needed. If no additional bandwidth is needed then the method may return to step 405 to detect another secondary synchronization channel in a subsequent superframe. If additional bandwidth is needed then the method continues to step 425 where the endpoint requests additional bandwidth. The bandwidth request may be sent to a network manager. The network manager may be an entity responsible for managing the resources of a particular cell or cluster of cells. In some embodiments, this may be a macro base station responsible for a cell cluster. At step 430 the endpoint receives permission from the network manager to begin cooperative data transfer. Once the endpoint has received permission to begin cooperative data transfer the endpoint may establish an alternate wireless connection with the alternate access station at step 435. This may allow the endpoint to initiate cooperative data transfer operation at step 440. Because the endpoint initiated and stored the multipoint ranging information at step 415, the endpoint is able to quickly and effectively establish the alternate wireless connection. This may be true even if the alternate access station is at a much farther distance than the primary access station.

The cooperative data transfer operation may continue until it is determined that less bandwidth is needed. Once less bandwidth is needed at step 450, cooperative data transfer operations may be terminated. In particular embodiments, this may involve the endpoint requesting that the network manager release the additional resources reserved for the cooperative data operations.

Thus far several different embodiments and features have been presented. Particular embodiments may combine one or more of these features depending on operational needs and/or component limitations. This may allow for great adaptability to the needs of various organizations and users. For example, a particular embodiment may use several base stations to provide wireless access for a metropolitan area, or a single base station may be used with several relay stations and/or femto base stations to provide the necessary coverage. As another example, while the examples described herein have been directed to wireless systems based on IEEE 802.16 standards, particular embodiments may be employed in any other wireless communication system.

Some of the steps illustrated in FIG. 4 may be combined, modified or deleted where appropriate, and additional steps may also be added to the flowchart. For example, during some frames the endpoint may not be able to detect any nearby access stations able to facilitate cooperative data transfers. Additionally, steps may be performed in any suitable order without departing from the scope of particular embodiments.

Although particular embodiments have been described in detail, it should be understood that various other changes, substitutions, combinations and alterations may be made hereto without departing from the spirit and scope of the disclosure. For example, although an embodiment has been described with reference to a number of elements included within communication system 100 such as endpoints, base stations and relay stations, these elements may be combined, rearranged or positioned in order to accommodate particular routing architectures or needs. In addition, any of these elements may be provided as separate external components to communication system 100 or each other where appropriate. The present invention contemplates great flexibility in the arrangement of these elements as well as their internal components.

Numerous other changes, substitutions, variations, alterations and modifications may be ascertained by those skilled in the art and it is intended that certain embodiments encompass all, some or none of these changes, substitutions, variations, alterations and modifications as falling within the spirit and scope of the appended claims.

What is claimed:

1. A method for cooperative data transfer, comprising:
   establishing a primary wireless connection with a primary access station using a primary synchronization channel and at least one secondary synchronization channel, the primary and secondary synchronization channels transmitted during separate frames of a super frame comprising a plurality of frames;
   detecting an alternate secondary synchronization channel generated by an alternate access station during a different frame of the super frame than the frames in which the primary and secondary synchronization channels are transmitted;
   determining whether the alternate secondary synchronization channel has a signal strength greater than a threshold signal strength; and
   receiving permission to begin a cooperative data transfer operation with both the primary access station and the alternate access station.

2. The method of claim 1, further comprising initiating multipoint ranging to determine a propagation delay from the alternate access station.

3. The method of claim 1, further comprising:
   determining whether additional bandwidth above a bandwidth associated with the primary wireless connection is required; and
   requesting additional bandwidth.

4. The method of claim 1, further comprising:
   determining a decrease in required bandwidth, the decreased bandwidth less than an amount of bandwidth available via the primary wireless connection; and
   terminating cooperative operation with the alternate access station.

5. The method of claim 1, further comprising:
establishing an alternate wireless connection with the alternate access station, the alternate wireless connection established concurrently with the primary wireless connection; and
initiating cooperative data transfer operations with both the primary access station and the alternate access station.

6. The method of claim 1, wherein:
the superframe comprises four frames, wherein:
   a first frame comprises a primary synchronization channel used by all access stations within a cluster of cells as defined by an operator;
   a second frame and a fourth frame comprise secondary synchronization channels used by all macro base station type access stations; and
   a third frame comprises a secondary synchronization channel used by a femto base station type access station.

7. A system for cooperative data transfer, comprising:
an interface configured to:
   establish a primary wireless connection with a primary access station using a primary synchronization channel and at least one secondary synchronization channel, the primary and secondary synchronization channels transmitted during separate frames of a super frame comprising a plurality of frames; and
   detect an alternate secondary synchronization channel generated by an alternate access station during a different frame of the super frame than the frames in which the primary and secondary synchronization channels are transmitted; and
a processor coupled to the interface and configured to determine whether the alternate secondary synchronization channel has a signal strength greater than a threshold signal strength;
wherein the interface is further configured to receive permission to begin a cooperative data transfer operation with both the primary access station and the alternate access station.

8. The system of claim 7, wherein the processor is further configured to initiate multipoint ranging to determine a propagation delay from the alternate access station.

9. The system of claim 7, wherein the processor is further configured to:
determine whether additional bandwidth above a bandwidth associated with the primary wireless connection is required; and
request additional bandwidth.

10. The system of claim 7, wherein the processor is further configured to:
determine a decrease in required bandwidth, the decreased bandwidth less than an amount of bandwidth available via the primary wireless connection; and
terminate cooperative operation with the alternate access station.

11. The system of claim 7, wherein:
the interface is further configured to establish an alternate wireless connection with the alternate access station, the alternate wireless connection established concurrently with the primary wireless connection; and
the processor is further configured to initiate cooperative data transfer operations with both the primary access station and the alternate access station.

12. The system of claim 7, wherein:
the superframe comprises four frames, wherein:
   a first frame comprises a primary synchronization channel used by all access stations within a cluster of cells as defined by an operator;
   a second frame and a fourth frame comprise secondary synchronization channels used by all macro base station type access stations; and
   a third frame comprises a secondary synchronization channel used by a femto base station type access station.

13. Logic encoded in a non-transitory computer readable medium/device that when executed by a processor is configured to:
establish a primary wireless connection with a primary access station using a primary synchronization channel and at least one secondary synchronization channel, the primary and secondary synchronization channels transmitted during separate frames of a super frame comprising a plurality of frames;
detect an alternate secondary synchronization channel generated by an alternate access station during a different frame of the super frame than the frames in which the primary and secondary synchronization channels are transmitted;
determine whether the alternate secondary synchronization channel has a signal strength greater than a threshold signal strength; and
receive permission to begin a cooperative data transfer operation with both the primary access station and the alternate access station.

14. The logic of claim 13, further configured to initiate multipoint ranging to determine a propagation delay from the alternate access station.

15. The logic of claim 13, further configured to:
determine whether additional bandwidth above a bandwidth associated with the primary wireless connection is required; and
request additional bandwidth.

16. The logic of claim 13, further configured to:
determine a decrease in required bandwidth, the decreased bandwidth less than an amount of bandwidth available via the primary wireless connection; and
terminate cooperative operation with the alternate access station.

17. The logic of claim 13, further configured to:
establish an alternate wireless connection with the alternate access station, the alternate wireless connection established concurrently with the primary wireless connection; and
initiate cooperative data transfer operations with both the primary access station and the alternate access station.

18. The logic of claim 13, wherein:
the superframe comprises four frames, wherein:
   a first frame comprises a primary synchronization channel used by all access stations within a cluster of cells as defined by an operator;
   a second frame and a fourth frame comprise secondary synchronization channels used by all macro base station type access stations; and
a third frame comprises a secondary synchronization channel used by a femto base station type access station.

* * * * *